PLOT OF PERMEABILITY OF SILICA GLASS TO VARIOUS GASES

United States Patent Office 3,100,868
Patented Aug. 13, 1963

3,100,868
LIGHT GAS DETECTOR USING THIN WALLED GLASS TUBES FOR DIFFUSION
Kenneth B. McAfee, Jr., Summit, N.J., assignor to Bell Telephone Laboratories, Incorporated, New York, N.Y., a corporation of New York
Filed Aug. 20, 1958, Ser. No. 756,115
6 Claims. (Cl. 324—33)

The invention relates to a process and apparatus for the detection of gases.

Large pipelines are today carrying vast quantities of hydrogen and helium. Laboratories and industries are using increasing amounts of the tracer gases such as hydrogen, helium, deuterium, tritium and neon. Vessels that are to be pressurized are tested with tracer gases to insure against leaks. As a result, there is an increasing demand for a simple, inexpensive and portable gas detector that is highly sensitive to the tracer gases enumerated above.

One prior art device used for these purposes is the mass spectrometer. This device has the disadvantage, however, of being expensive and bulky. Where the gas to be detected is combustible, it may be detected by the change of the burning rate of a flame, for example, the use of hydrogen detectors in mines. The disadvantages of such detecting means including insensitivity and danger to the operator are apparent.

In accordance with this invention, there is described a device particularly adapted to the detection of helium. The device is also sensitive to tracer gases such as hydrogen, deuterium, tritium and neon. The device is rugged, inexpensive, portable and can be kept in storage for long periods of time without deterioration.

The detection of gases by this device is dependent upon the selectivity of thin walled glass tubing to the enumerated gases. The sensitivity of the device to varying amounts of one or all of the gases is proportional to the surface area of the tubing which is increased by using a multiplicity of tubing. The tubing is arranged so as to be contacted on the outside by a gas mixture containing one or more of the enumerated gases. One end of the tubing is closed while the other end opens into a common enclosure. The actual detection of the gas or gases that diffuse through the tubing walls is achieved by a detecting element such as an ionization manometer which is connected to the common receptacle.

Figure 1:
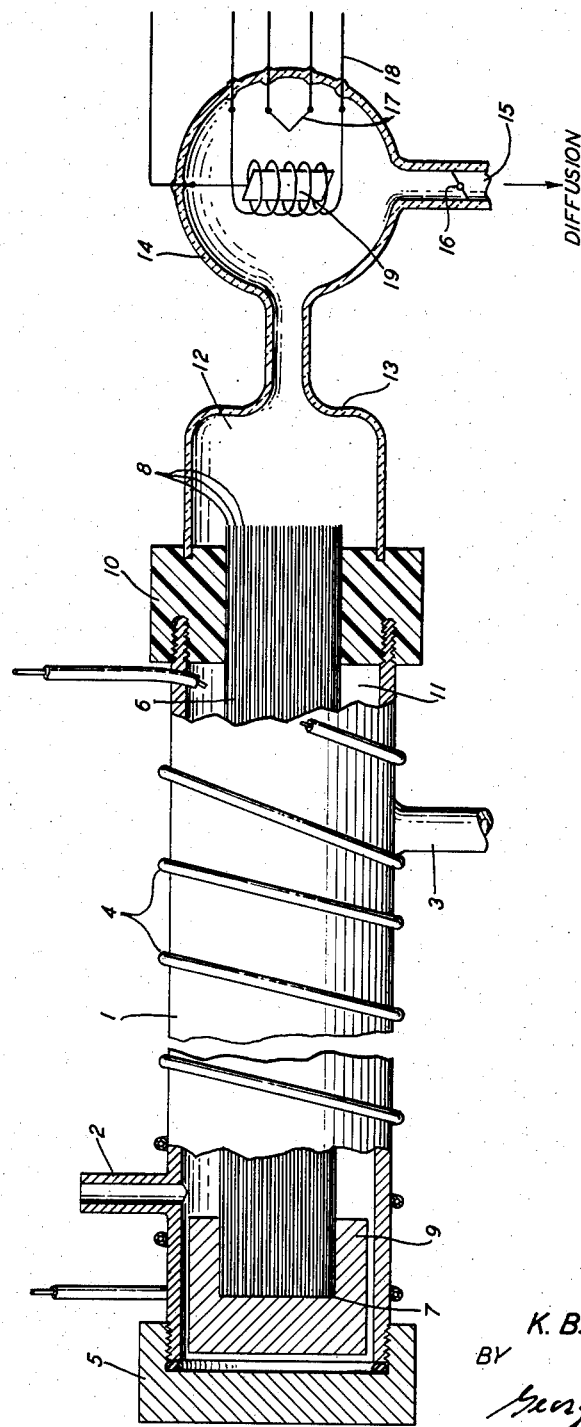
Figure 2:
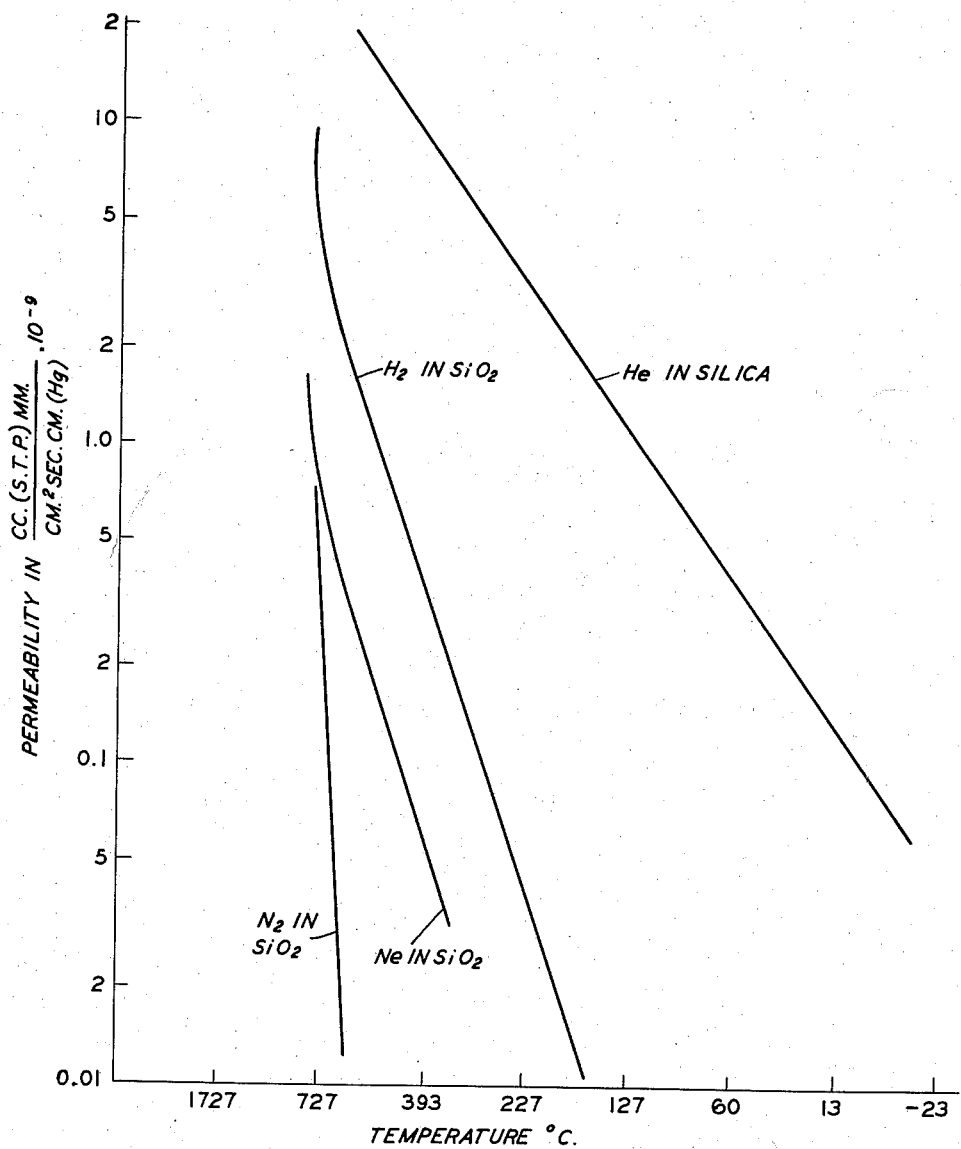

A more complete understanding of the features of this invention together with additional objects thereof may be gained from the following description in conjunction with the accompanying drawings in which:

FIG. 1 is a front elevational view partially in section showing a detecting element in conjunction with a sensing element; and FIG. 2 on coordinates of permeability versus temperature is a plot of permeability of a preferred glass material to various gases.

With reference now more specifically to the drawings, the device shown in FIG. 1 is thirty-six inches long and utilizes a sensing element comprising a gas-tight metal jacket 1 formed for example of "Kovar" metal having gas inlet 2, gas outlet 3, and an insulated heating wire 4 encircling the surface. One end of the jacket 1 is closed by metal cap 5. The jacket 1 encloses approximately two miles of silica tubing 6 having closed ends 7 and open ends 8. The tubes have outside diameter of seventeen mils and a wall thickness of three mils. The closed ends of the tubing are sealed in a gas-tight floating head 9 of, for example, epoxy resin arranged to keep the tubes in a fixed position. The open ends of the tubing pass through a gas-tight seal 10 of, for example, epoxy resin which provides a gas-tight barrier between enclosure 11 and enclosure 12 with the latter enclosure common to the open ends 8 of tubes 6. Neck 13 is connected to an ionization manometer which comprises a housing 14 having outlet 15 provided with valve 16 leading to a diffusion pump, not shown. Housing 14 encloses filament 17 having ten volts impressed thereon, anode 18 having plus 150 volts impressed thereon, and cathode 19 having minus fifteen volts impressed thereon.

In operation, the detector which operates at room pressure is placed in the vicinity of a leak. The gas escaping through the leak goes into inlet 2 of the detector, diffuses through the tubing 6 and hence into the detecting element which is maintained at a partial vacuum of $10^{-6}$ millimeters of mercury. The gas atoms flowing into the detecting element are ionized by electrons from filament 17. The resulting ions flow to cathode 19 and induce a current thereon. This current, which is a measure of the amount of gas diffusing through the tubing can be measured by a galvanometer, for example by a Veeco Vacuum Gage, which amplifies the current before measurement. Since under normal operating conditions the tubing walls are virtually impermeable to atmospheric gases, the entire measured induced current is due to the leak. If there is a gas in the atmosphere to which the detector is sensitive, the galvanometer can be adjusted to give a compensated zero reading before being placed next to the leak.

Although specific values have been used in describing the device of FIG. 1, it is to be understood that these values are exemplary only.

The detector is designed to operate at room pressure with a partial vacuum, for example, of $10^{-3}$ to $10^{-10}$ millimeters of mercury maintained inside the tubing and detecting unit. The amount of gas per second diffusing through the tubing is a function of the diameter of the tubing to the wall thickness. A ratio of from four to one to six to one is preferred. The time for diffusion is desirably small, in the order of one second or less. This time is proportional to the wall thickness squared over the diffusion constant.

Tubing having an outside diameter ranging from one mil to fifty mils and a wall thickness varying from 0.2 mil to ten mils is suitable. These limits are based on practical considerations. Thinner tubing is generally undesirable only from the standpoint of fragility; thicker tubing although operative necessitates additional bulk and affects only portability.

In general it is preferable to form the tubes of a glass which includes at least a total aggregate of seventy-five percent of one or more of the "glass-forming" substances silica ($SiO_2$), boron oxide ($B_2O_3$), aluminum oxide ($Al_2O_3$), and phosphorus trioxide ($P_2O_3$). Glasses comprising at least seventy-five percent of silica and glasses comprising at least seventy-five percent of silica and a maximum of fifteen percent boron oxide ($B_2O_3$) are among the better glasses for the purposes of this invention. For example, fused silica glass (100% silica), chemical Pyrex glass [81% silica ($SiO_2$), 13% boron oxide ($B_2O_3$), 2% aluminum oxide ($Al_2O_3$), and 4% sodium oxide ($Na_2O$) and/or potassium oxide ($K_2O$)] and "Vycor" glass [96% silica ($SiO_2$), 3% boron oxide ($B_2O_3$), and 1% aluminum oxide ($Al_2O_3$)] have been successfully used in the device of this invention. Silica tubes have been found to be particularly advantageous, having at room temperature a permeability to helium as much as one thousand times greater than that for hydrogen, the next smallest atom.

Referring to FIG. 2, the effect of temperature on the permeability of silica tubing to various gases is plotted. At room temperature exceptionally pure helium is diffused through the silica tubing even though the initial gas mixture may contain hydrogen and neon. This results since helium with its atoms only 2A. in diameter diffuses through the walls of the tubing, whereas hydrogen, the next smallest atom, while being only twenty-five percent larger than helium, has a diffusion constant through the tubing one thousand times smaller. Larger gas molecules such as methane with a diameter of 2.5 A. has such small diffusion constants that they will not pass through the glass tubing in any significant quantity.

As the operating temperature is raised, for example, by "Nichrome" wire 4 surrounding mellic jacket 1, kinetic energy is imparted to gas molecules surrounding the ceramic tubing 6. This energy increases the diffusion constant of each of the gases in the mixture. At approximately 165° C. hydrogen commences to diffuse through the tubing in appreciable amounts. At an even more elevated temperature, approximately 270° C., neon commences to diffuse through the tubing in appreciable amounts. The temperature range of this device may vary from room temperature to 400° for Pyrex tubing, and from room temperature to 800° C. for silica tubing without any deteriorating effects on the tubing. It is evident that by using two or more sensing elements operating at selected temperatures in combination with a detecting element, it is possible to detect any one gas of the group consisting of helium, hydrogen, deuterium, tritium, or neon from a gas mixture.

As an alternative arrangement, the gas mixture may be admitted to the inside of the glass tubing. The gas to be detected then diffuses out of the tubing and flows into the detecting element.

The detector of the present invention is capable of detecting leaks of very small magnitude. For example, the following table shows the sensitivity of a detector of this invention using Pyrex tubing to varying percentages of helium present in a gas mixture. The operating temperature was maintained at 357° C. to 392° C. and a Veeco vacuum gage was used to measure the induced current on the cathode of the ionization manometer. In this example, the induced current was read as a function of the difference multiplied by a factor of 23.6 between the end pressure reading and the original pressure reading on the manometer.

| Percent helium | Original pressure | End pressure | Difference (mm. Hg) |
|---|---|---|---|
| 1.0 | $3.4 \times 10^{-7}$ | $5.2 \times 10^{-5}$ | $1.22 \times 10^{-3}$ |
| 0.1 | $3.8 \times 10^{-7}$ | $4.1 \times 10^{-6}$ | $8.80 \times 10^{-5}$ |
| 0.01 | $5.8 \times 10^{-7}$ | $8.0 \times 10^{-7}$ | $5.20 \times 10^{-6}$ |
| 0.0013 | $3.6 \times 10^{-7}$ | $4.1 \times 10^{-7}$ | $1.18 \times 10^{-6}$ |
| 0.0004 | $4.2 \times 10^{-7}$ | $4.4 \times 10^{-7}$ | $4.73 \times 10^{-7}$ |

What is claimed is:

1. A gas detecting device comprising a sensing element having a multiplicity of thin walled glass tubes having an outside diameter varying from one mil to fifty mils and a wall thickness varying from 0.2 mil to ten mils through which a gas to be detected diffuses and a detecting element sensitive to the gas diffusing through the glass tubes.

2. The detecting device in accordance with claim 1 wherein the tubes are made of a glass having a silica content of at least seventy-five percent.

3. The detecting device in accordance with claim 1 wherein the tubes are made of a glass comprising a minimum of seventy-five percent silica ($SiO_2$) and a maximum of fifteen percent boron oxide ($B_2O_3$).

4. The detecting device in accordance with claim 1 wherein the tubes are made of a glass comprising at least a total aggregate of seventy-five percent of one or more of the glass forming substances selected from the group consisting of silica ($SiO_2$), boron oxide ($B_2O_3$), aluminum oxide ($Al_2O_3$), and phosphorus trioxide ($P_2O_3$).

5. The detecting device in accordance with claim 1 wherein means is provided for maintaining a partial vacuum of $10^{-3}$ to $10^{-10}$ millimeters of mercury.

6. A gas detecting device comprising a gas-tight jacket having a gas inlet and a gas outlet, a heating wire encircling said jacket, a multiplicity of thin walled glass tubes having an outside diameter varying from one mil to fifty mils and a wall thickness varying from 0.2 mil to ten mils enclosed by said jacket, said tubes being sealed at one end and opening into a common enclosure at the other end, said enclosure being connected with an ionization manometer, and means for counting the ions produced by said manometer.

References Cited in the file of this patent

UNITED STATES PATENTS

| | | |
|---|---|---|
| 2,400,940 | McCollum | May 28, 1946 |
| 2,526,038 | Nelson | Oct. 17, 1950 |
| 2,671,337 | Hulsberg | Mar. 9, 1954 |
| 2,734,592 | Jones | Feb. 14, 1956 |
| 2,909,919 | Myer | Oct. 27, 1959 |
| 2,921,210 | Schaschl et a. | Jan. 12, 1960 |

FOREIGN PATENTS

| | | |
|---|---|---|
| 431,507 | Germany | July 8, 1926 |